US012612025B2

(12) United States Patent (10) Patent No.: US 12,612,025 B2

Marx et al. (45) Date of Patent: Apr. 28, 2026

(54) METHOD FOR OPERATING A BRAKE SYSTEM OF A VEHICLE, AND BRAKE SYSTEM

(71) Applicant: ZF Active Safety GmbH, Koblenz (DE)

(72) Inventors: Andreas Marx, Hartenfels (DE); Fabian Querbach, Lonnig (DE)

(73) Assignee: ZF Active Safety Gmbh, Koblenz (DE)

( * ) Notice: Subject to any disclaimer, the term of this patent is extended or adjusted under 35 U.S.C. 154(b) by 421 days.

(21) Appl. No.: 18/464,555

(22) Filed: Sep. 11, 2023

(65) Prior Publication Data

US 2024/0083406 A1 Mar. 14, 2024

(30) Foreign Application Priority Data

Sep. 12, 2022 (DE) .......................... 102022123152.6

(51) Int. Cl.
| | |
|---|---|
| *B60T 17/22* | (2006.01) |
| *B60L 7/24* | (2006.01) |
| *B60T 8/26* | (2006.01) |
| *F16D 65/38* | (2006.01) |
| *F16D 66/00* | (2006.01) |

(52) U.S. Cl.
CPC ................ *B60T 17/22* (2013.01); *B60L 7/24* (2013.01); *B60T 8/26* (2013.01); *F16D 65/38* (2013.01); *F16D 66/00* (2013.01); *B60T 2270/60* (2013.01); *F16D 2065/386* (2013.01); *F16D 2066/005* (2013.01); *F16D 2066/006* (2013.01)

(58) Field of Classification Search
CPC .......... B60T 8/26; B60T 13/741; B60T 13/14; B60T 13/22; B60T 17/22; B60L 7/24; B60L 7/26
See application file for complete search history.

(56) References Cited

U.S. PATENT DOCUMENTS

| | | | | |
|---|---|---|---|---|
| 2010/0268430 A1* | 10/2010 | Bentner | ................ | B60T 13/746 701/70 |
| 2012/0089311 A1* | 4/2012 | Burnett | ................... | B60T 7/042 701/70 |

(Continued)

FOREIGN PATENT DOCUMENTS

DE 102021207447 A1 1/2023

*Primary Examiner* — Tan Q Nguyen
(74) *Attorney, Agent, or Firm* — Kristin L. Murphy

(57) ABSTRACT

A brake system of a vehicle, with electromechanical service brakes on at least one axle designed without force sensors, having a control unit designed to control a braking operation for meeting a braking demand by activating the electromechanical service brakes of all the axles. An acquisition element on each of the electromechanical service brakes acquires a parameter from which a current brake touch point of the electromechanical service brake in question can be determined. For operating the brake system, the brakes on one of the axles of the vehicle are actuated during a braking operation. A current value of a brake touch point of the electromechanical service brakes on another axle that is currently not being used to provide the brake force of the ongoing braking operation is determined. An air gap of those electromechanical service brakes is set according to the current value of the brake touch point.

17 Claims, 5 Drawing Sheets

(56) References Cited

U.S. PATENT DOCUMENTS

2015/0344013 A1 * 12/2015 Knechtges ............ B60T 13/588
                                                    303/14
2017/0297548 A1 * 10/2017 Baehrle-Miller ....... F16D 65/18

* cited by examiner

METHOD FOR OPERATING A BRAKE SYSTEM OF A VEHICLE, AND BRAKE SYSTEM

CROSS-REFERENCE TO RELATED APPLICATION

This application claims priority to German Priority Application No. 102022123152.6, filed Sep. 12, 2022, the disclosure of which is incorporated herein by reference in its entirety.

TECHNICAL FIELD

The disclosure relates to a method for operating a brake system of a vehicle having a plurality of axles provided with electromechanical service brakes, and to such a brake system.

BACKGROUND

Unlike conventional hydraulically actuated brakes, an electromechanical brake has an element, for example a ball screw, which is moved electromotively and which acts on movable friction elements of the brake in order to close the brake. The power supplied by the electric motor is converted into a movement of the friction elements of the brake towards one another. For example, a brake pad is pressed against a brake disc and thus the brake pressure necessary for closing the brake is generated.

Electromechanical brakes can be used both as a parking brake and as a service brake. Unlike the parking brake, which secures the parked vehicle, the service brake is used to effect a temporary deceleration of the vehicle while it is in motion.

It is desirable to know the brake pressure, or the brake force generated by the electric motor, during actuation of the brake. Because the necessary actuation path of the brake changes over time while the vehicle is in motion, inter alia because of wear, but also due to the effect of temperature, regular acquisition is necessary. Force sensors are conventionally used for this purpose. However, their use is space-consuming and expensive.

In particular, knowledge of the initial air gap between the friction elements of the brake is useful for precise setting of the brake force. The air gap denotes the distance which the friction elements must travel relative to one another to a brake touch point, at which the friction elements come into contact with one another with an appreciable friction force.

SUMMARY

What is needed is to make operation of a brake system simple, reliable and inexpensive despite the use of electromechanical service brakes without force sensors.

A method for operating a brake system of a vehicle having a plurality of axles provided with electromechanical service brakes is disclosed, wherein at least the electromechanical service brakes on one axle are electromechanical brakes without force sensors, comprising the steps:

actuating the electromechanical service brakes on one of the axles of the vehicle during a braking operation in order to provide at least part of a required brake force, determining a current value of a brake touch point of the electromechanical service brakes without force sensors on another axle that is currently not being used to provide the brake force of the ongoing braking operation, and setting an air gap of those electromechanical brakes without force sensors in accordance with the current values of the brake touch point.

In this manner, actuation of the electromechanical service brakes outside of a current braking operation is avoided. At the same time, however, sufficient time is available to carry out the determination of the brake touch point, because the brakes that are in the process of being measured do not have to contribute towards the deceleration of the vehicle at the time of the measurement. As a result of the adjustment of the air gap that is thus possible while the vehicle is in motion, it is ensured that the slip torques of the brakes are reduced as far as possible.

The position of the brake touch point is subject to relatively rapid changes over time and sometimes changes even while the vehicle is in motion. Because even very small changes are of consequence, the determination of the current value of the brake touch point is preferably carried out repeatedly at intervals for all the electromechanical service brakes without force sensors of the vehicle while the vehicle is in motion. It is possible to carry out the determination of the current brake touch point at each braking operation at least for some brakes of the vehicle.

In one exemplary arrangement, setting of the air gap is carried out by a mechanical change of the position of the friction elements of the brake in the unactuated state of the brake.

In this application, the operation of electromechanical service brakes of a vehicle is in principle considered. For reasons of readability, the term "brake" is used synonymously.

In addition to the current brake touch point, a current force-travel characteristic curve of the brake is also known. The force-travel characteristic curve is used to activate the brake in the event of a braking demand. This force-travel characteristic curve can be determined in any suitable manner and at any suitable point in time.

In one exemplary arrangement, a basic zero value of the brake is determined in the workshop and stored as a reference value. Starting from this reference value, the position of the brake touch point and the force-travel characteristic curve can be established. This reference value can be determined, for example, by carrying out a reference run outside of normal driving operation by the electric motor to a rear stop of the electromechanical service brake.

In order to determine the current value of the brake touch point of the electromechanical service brake, an electric motor of the electromechanical service brake is energized, for example, and a rotation speed of the motor is acquired. The brake touch point can be concluded from a reduction in the rotation speed, because the mechanical resistance increases once the friction elements come into contact. In one exemplary arrangement, activation takes place with a constant, unregulated current. For example, a travel point at which the rotation speed falls is determined. This travel point is given by evaluating a total rotation angle, associated with that point in time, of the shaft of the electric motor, which is advantageously acquired at the same time. It is optionally provided to repeat this process multiple times in order to obtain a more accurate, averaged value.

Generally, in the case of a braking operation in which the electromechanical service brakes of the vehicle bring about a deceleration of the vehicle in order to meet a braking demand, only the brakes of one axle are initially actuated for the braking operation, while at the same time the determination of the current brake touch point is carried out on at least one other axle for the brakes arranged there.

In principle, the determination of the brake touch point should be carried out simultaneously and symmetrically for all the brakes on an axle of the vehicle.

If the current braking demand cannot be met by the brakes which have hitherto been actuated solely for decelerating the vehicle, the brakes of the other axle(s) are brought in, wherein a measurement that may still be ongoing for determining the brake touch point is terminated in favour of the actuation of that brake for decelerating the vehicle.

Activation of the brakes of the second axle should always be carried out with a blending in of the brake forces that are generated, with a gentle, stepless transition. A reduction of the brake force at the end of the braking operation is then carried out at both axles simultaneously, in order to avoid steps.

Thus, electromechanical service brakes on a plurality of axles of the vehicle can be actuated in order to meet a braking demand. The electromechanical service brakes of one axle are actuated first, and then electromechanical service brakes without force sensors of another axle are connected in, wherein a current value of the brake touch point of the electromechanical service brakes without force sensors on that axle is determined before those electromechanical service brakes are connected in.

In one possible variant, electromechanical service brakes provided with force sensors on a first axle of the vehicle are actuated at each braking operation, and a current value of the brake touch point is determined at electromechanical service brakes without force sensors on a second axle of the vehicle at least during some braking operations. The brakes of the second axle develop only a negligible vehicle-decelerating action during the measurement during the current braking operation.

In one exemplary arrangement, the first axle is the front axle of the vehicle, because actuation of the brakes on the front axle is in very many cases already sufficient to meet a braking demand.

Although the brakes of the second axle contribute only rarely towards decelerating the vehicle, wear of the friction elements and the load on the actuators of the brake can nevertheless be reduced significantly by frequent measurement of the current brake touch point. Thus, it is even possible in some circumstances to avoid changing the friction elements on those brakes over the entire lifetime of the vehicle.

If, however, the braking demands exceed the brake force which can be applied by the brakes that have hitherto been actuated, or if a braking scheme comes into force which also provides for actuation of the brakes on the second axle (e.g. ABS), the brakes of the second axle are connected in such that they decelerate the vehicle. If the determination of the current brake touch point is already complete at this point in time, the newly determined values are used. Otherwise, stored values are accessed. The determined values of the last successful measurement, for example, can here be used.

If a plurality of axles of the vehicle are equipped with electromechanical service brakes without force sensors, the determination of the current value of the brake touch point of the electromechanical service brakes can be carried out on different axles of the vehicle in alternation.

For example, where there are brakes without force sensors on a plurality of axles of the vehicle, the electromechanical service brakes of one axle can first be actuated, and the electromechanical service brakes of another axle can be connected in after the determination of the current brake touch point has been carried out on the electromechanical service brakes that are connected in. In the case of braking operations which take place in succession in time, the electromechanical service brakes that are actuated first then alternate. The brakes that are actuated first in each case use the previously stored value for the brake touch point. For example, a change of the axles whose brakes are actuated first can take place at each braking operation or in accordance with a different predefined scheme.

If all the axles of the vehicle are provided with electromechanical service brakes without force sensors, it is possible to carry out a braking operation in which the brakes of a rear axle of the vehicle are to be actuated first only if there is a braking demand with low vehicle deceleration which can be performed by the brakes of the rear axle alone, without this being noticeable to the occupants of the vehicle.

If at least one of the axles is connected to a regenerative electric motor of the vehicle, the determination of the current brake touch point can be carried out at least on the electromechanical service brakes without force sensors of one axle during regeneration. In this case, the electromechanical service brakes without force sensors of all the axles can optionally be measured at the same time.

In this case too, the electromechanical service brakes of one or more axles are of course connected in if the braking demand cannot be met by regeneration alone.

In this case, deceleration of the vehicle is initially carried out, for example, only by the mechanical resistance of the drive motor that occurs during current production by regeneration. If this is not sufficient, the brakes on the front axle of the vehicle are additionally connected in. If this is still not sufficient to meet the braking demand, the brakes on the rear axle are additionally connected in.

During regeneration, determination of the current brake touch point can be started on all the electromechanical service brakes without force sensors of the vehicle. If this is not complete when brakes (without force sensors) on the front axle are to be connected in, the measurement is terminated. The same is true for the brakes on the rear axle.

In principle, it is always possible to switch to a different operating mode, for example ABS operation, if a hazardous situation is identified during braking. In this case, all measurements on the brakes are terminated and the brakes are activated individually in accordance with the driving situation that is present.

The above-mentioned object is also achieved with a brake system of a vehicle, with which a method described above can be carried out. The brake system comprises electromechanical service brakes on at least two axles of the vehicle, wherein the electromechanical service brakes on at least one axle are designed without force sensors. There is a control unit which is so designed that it is able to control a braking operation for meeting a braking demand by activating the electromechanical service brakes of all the axles in a temporal sequence. In addition, there is arranged on each of the electromechanical service brakes without force sensors an acquisition element which acquires a parameter from which a current brake touch point of the electromechanical service brake in question can be determined, wherein the control unit is so designed that it carries out the determination of the current brake touch point during the ongoing braking operation.

The acquisition element is, for example, a rotation speed sensor on an electric motor of the electromechanical service brake. The parameter is then, for example, the rotation speed or also the total rotation angle of the shaft. By applying a current and determining a fall in the rotation speed of a shaft of the electric motor, the brake touch point, at which the friction elements of the brake begin to come into contact with one another and consequently the mechanical resistance which is opposed to the electric motor increases, can readily be acquired.

The electromechanical service brakes are normally brake actuators at each individual wheel which are activated separately by the control unit of the brake system for actuation.

In one possible exemplary arrangement, the electromechanical service brakes on a front axle of the vehicle are equipped with force sensors, while the electromechanical service brakes on the rear axle are configured without force sensors.

In another exemplary arrangement, the electromechanical service brakes on a front axle and on a rear axle of the vehicle, for example, all the service brakes of the vehicle, are configured without force sensors.

BRIEF DESCRIPTION OF DRAWINGS

The disclosure will be described in greater detail hereinbelow by an exemplary arrangement with reference to the accompanying figures, in which.

DETAILED DESCRIPTION

Figure 1:
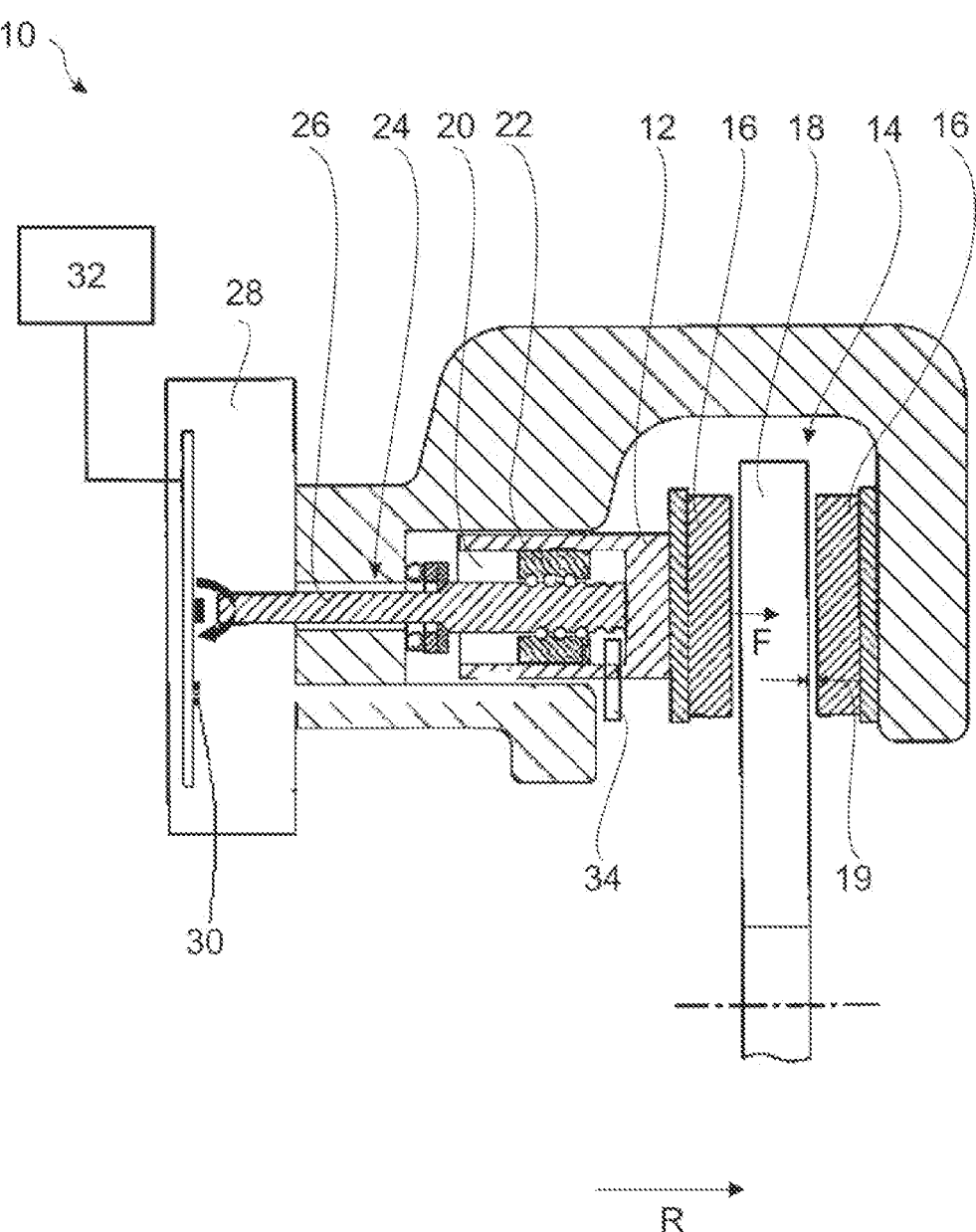
FIG. 1 shows a schematic representation of an electromechanical service brake without a force sensor which is suitable for use in a brake system according to the disclosure.

FIG. 1 shows, by way of example, an electromechanical service brake 10 without a force sensor of a vehicle, comprising an actuating piston 12 which acts on a brake assembly 14 and transmits a brake force F thereto.

The brake assembly 14 comprises cooperating friction elements. In the example shown here, the brake assembly 14 is a known floating calliper brake with two brake pads 16 and a brake disc 18 arranged between the brake pads. In the unactuated state, the brake pads 16 are spaced apart from the brake disc 18 by an air gap 19. The air gap can be, for example, about 0.3 mm.

A ball nut 22 of a ball screw 24 is accommodated in an inner hollow space 20 of the actuating piston 12. A spindle 26 of the ball screw 24 is coupled with an electric motor 28, the shaft of which is able to set the spindle 26 in rotation, which moves the ball nut 22 linearly along the spindle 26.

The ball nut 22 moves the actuating piston 12 in direction R towards the brake assembly 14, here in the direction towards one of the brake pads 16.

An acquisition element 30 is so arranged in the region of the electric motor 28 that it is able to measure a rotation speed of the shaft of the electric motor 28. The acquisition element 30 is here additionally so designed that it acquires a total rotation angle α of the shaft and thus a total rotation angle of the spindle 26. The total rotation angle α is in each case considered starting from a known zero point.

The determined values are transmitted to a control unit 32, processed and optionally stored. The control unit 32 communicates in a suitable manner with other components of a brake system 40 as well as with other systems in the vehicle.

The total rotation angle α is a directly measurable parameter which provides a clear relationship between the rotation of the shaft of the electric motor 28 and the position of the actuating piston 12. In the case of the service brake 10 shown here, all the components in the force flow are sufficiently rigid and connected to one another without substantial play. For example, they consist of metal. There is therefore a clear proportional relationship between the total rotation angle α of the shaft of the electric motor 28 and the position of the actuating piston 12. The position of the actuating piston 12 is reproducible and can be determined without hysteresis effects. Because the position of the actuating piston 12 is directly related to the brake force F, the total rotation angle α can be used as a direct measure of the actuating force F of the electromechanical service brake 10.

In the exemplary arrangement shown here, the service brake 10 comprises a locking mechanism 34 which is so designed that it is able to hold the brake assembly 14 in a closed position without the electric motor 28 having to be energized. In this manner, the service brake 10 can also be used as a parking brake when the vehicle is parked at the end of the journey. During normal driving operation, the locking mechanism 34 is fully released.

Figure 2:
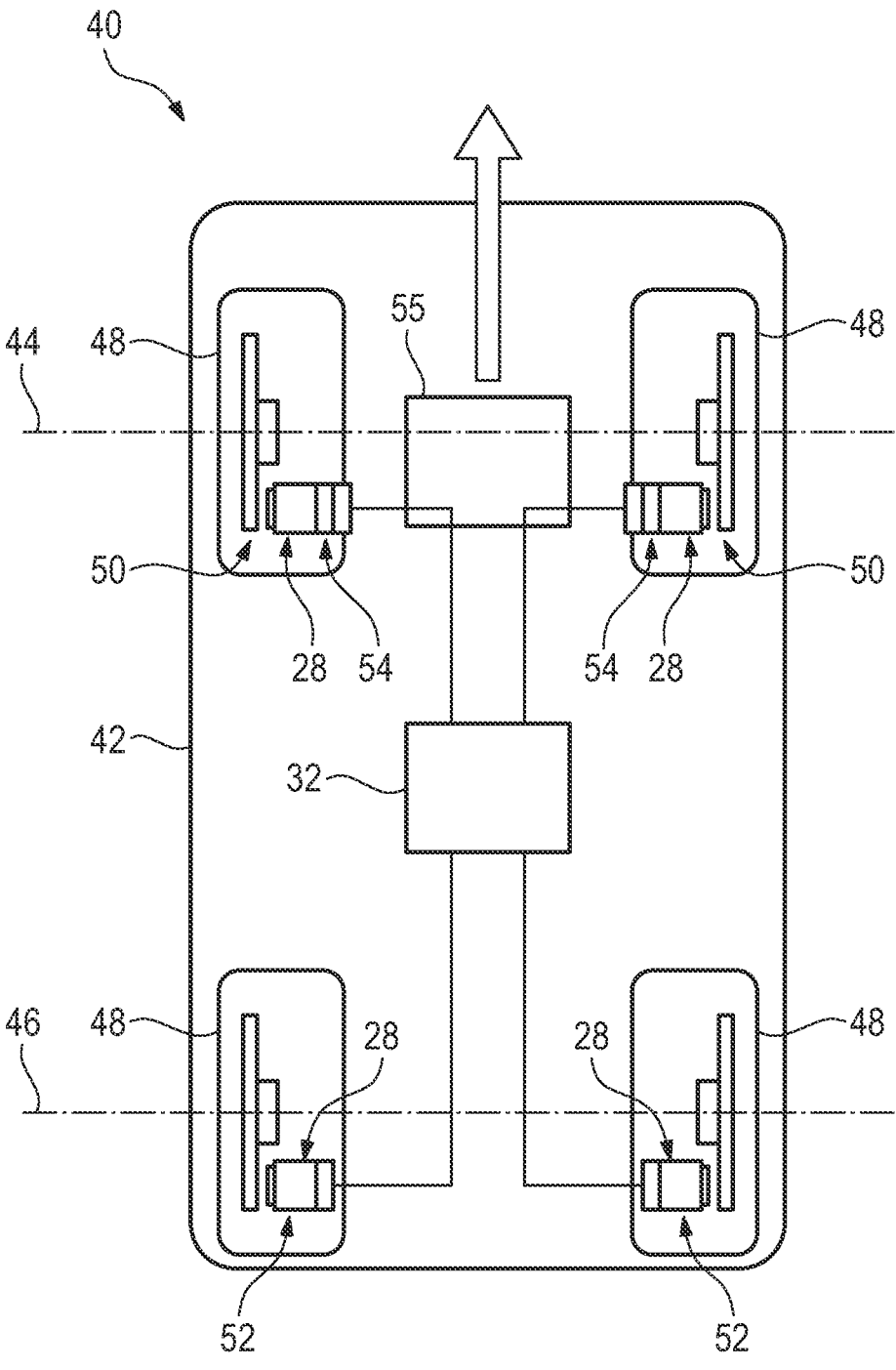
FIG. 2 shows a schematic representation of a brake system according to the disclosure of a vehicle, for carrying out a method according to the disclosure.

FIG. 2 shows an example of a brake system 40 of a vehicle 42, which is merely adumbrated. The vehicle 42 here has two axles 44, 46. The axle 44 is also referred to here as the first axle or as the front axle, while the axle 46 is also called the second axle or rear axle.

Figure 3:
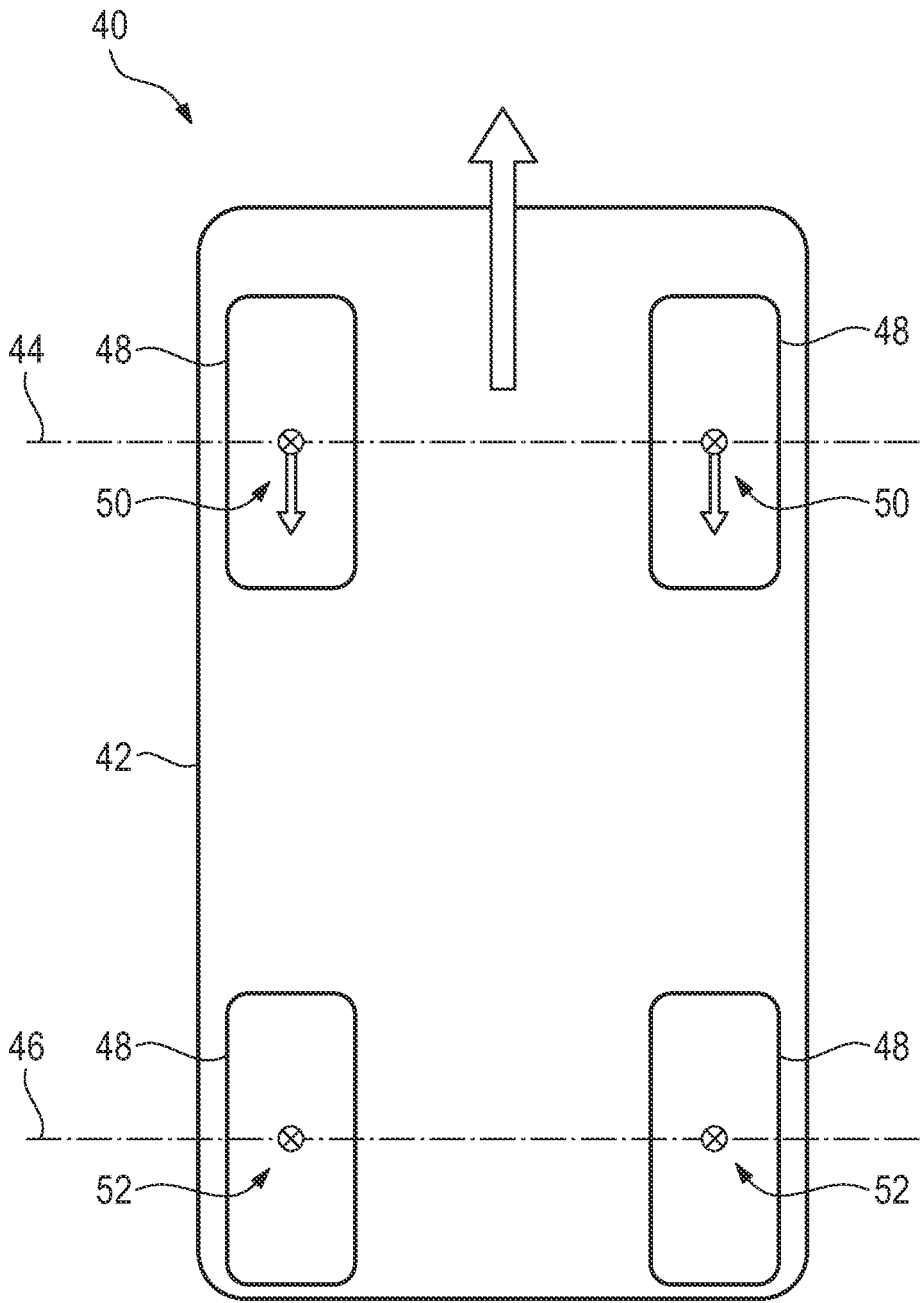
FIGS. 3 and 4 show possible sequences of the method according to the disclosure.
Figure 4:
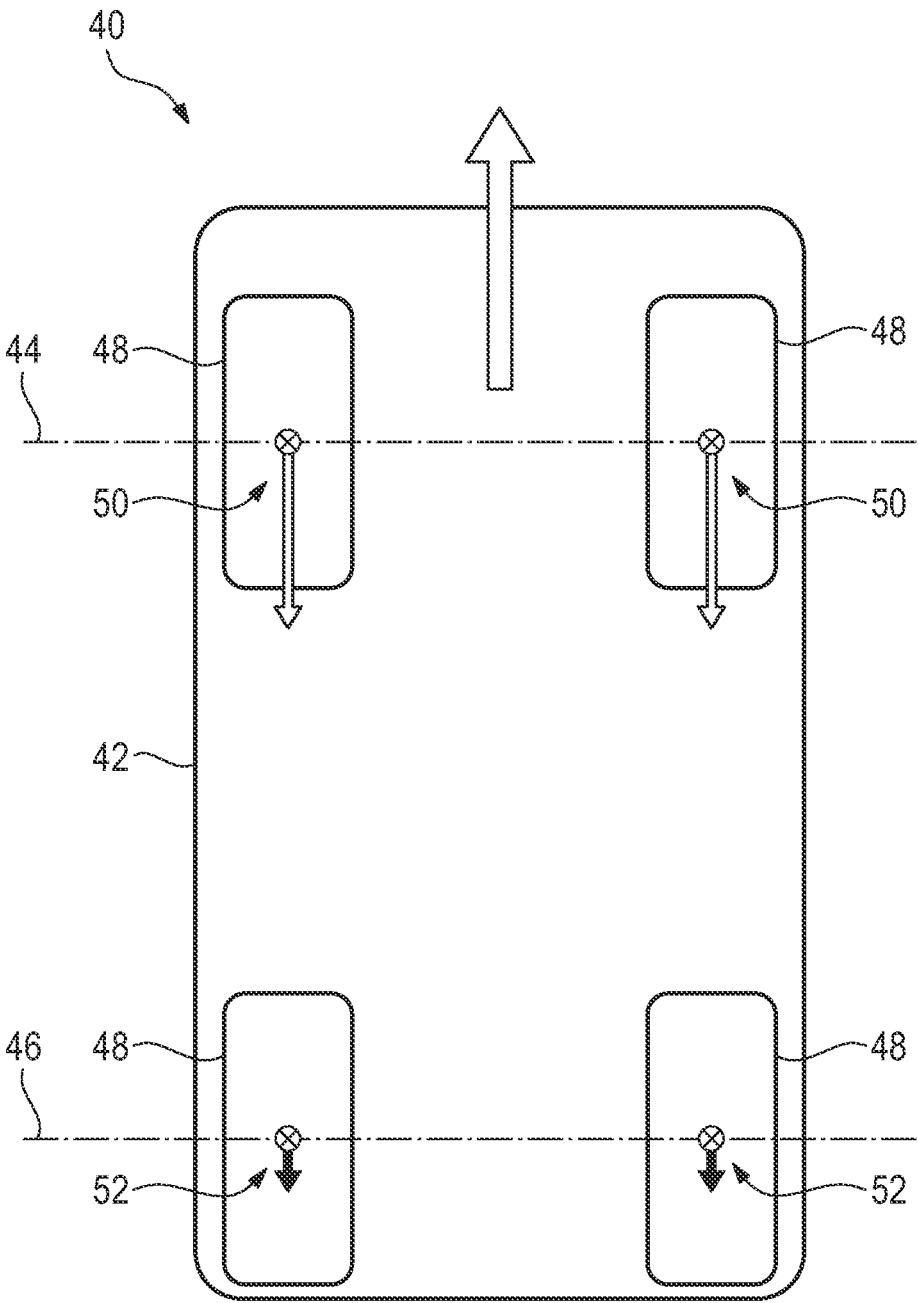

Two vehicle wheels 48 are arranged on each axle 44, 46. In this example, each vehicle wheel 48 has its own associated electromechanical service brake. In FIGS. 2 to 4, the electromechanical service brakes of the axle 44 are designated by reference sign 50 and the electromechanical service brakes of the axle 46 are designated by reference sign 52. The electromechanical service brakes 52 in particular are configured, for example, like the service brake 10 described above.

In the exemplary arrangements shown here, the electromechanical service brakes 50 each have a force sensor 54. The force sensor measures the actuating force F present at the electromechanical service brake 50, more specifically at the brake assembly 14.

The electromechanical service brakes 52 on the axle 46, on the other hand, are configured without force sensors, that is to say do not have a force sensor. The brake force F present at these electromechanical service brakes 52 is therefore not acquired directly.

In a variant which is not shown, all the electromechanical service brakes on all the wheels 48 are in the form of electromechanical service brakes 52 without force sensors.

Each of the electromechanical service brakes 50, 52 comprises its own electric motor 28, the shaft of which is in each case monitored by its own acquisition element 30.

In this example, there is provided on the front axle 44 a regenerative electric drive motor 55 which is able to meet at least part of the braking demand of a vehicle driver or of an autonomous system of the vehicle 42. In this case, the drive motor 55 acts as a generator, wherein it opposes a resistance to the rotation of the wheels 48, which brakes the vehicle 42.

The control unit 32 is here shown, by way of example, as a central control unit of the brake system 40 which is in communication with all the electromechanical service brakes 50, 52 and here also with the drive motor 55. As an alternative, the control unit 32 can be connected to and cooperate with further controllers in the brake system 40 and in the vehicle 42.

In order to be able to set the air gap 19 exactly, a brake touch point 56 (see FIG. 5) must be known. This is also known as the touch disc point and denotes a spacing of the friction elements of the brake 52 as from which contact occurs with an appreciable friction effect. When this brake touch point 56 is reached, the brake begins to close and to build up the brake force F.

In order to determine the brake touch point 56, the actuating piston 12 is moved by the rotation of the shaft of the electric motor 28, starting from a known reference point, in the direction towards the brake assembly 14. For example, a constant, unregulated current is applied to the electric motor 28. As long as the air gap 19 is not overcome, the shaft rotates at a high rotation speed, because the electric motor 28 does not have to overcome any appreciable mechanical resistance. As from the brake touch point 56, however, this resistance increases, which leads to a reduction in the rotation speed. This fall in the rotation speed is measured by the acquisition element 30.

The above-described sequence constitutes one possible option for determining the current value of the brake touch point 56.

For determining the brake touch point 56, the brake is not fully closed. This operation requires only a short period of time and does not produce any appreciable deceleration of the vehicle. This measurement is therefore carried out while the vehicle is in motion, in one exemplary arrangement, repeatedly at multiple points in time.

To this end, a normal braking operation of the vehicle 42 is utilized, in which a braking demand for deceleration of the vehicle 42 is implemented.

If the current brake touch point 56 of one of the electromechanical service brakes 52 without a force sensor is to be determined, first only the electromechanical service brakes on one axle of the vehicle 42 are actuated during a normal braking operation in order to provide a brake force F for decelerating the vehicle and in order to meet the braking demand. This is illustrated in FIG. 5 by curve 58.

In the example shown in FIGS. 2 to 5, these are the electromechanical service brakes 50 on the front axle 44.

Figure 5:
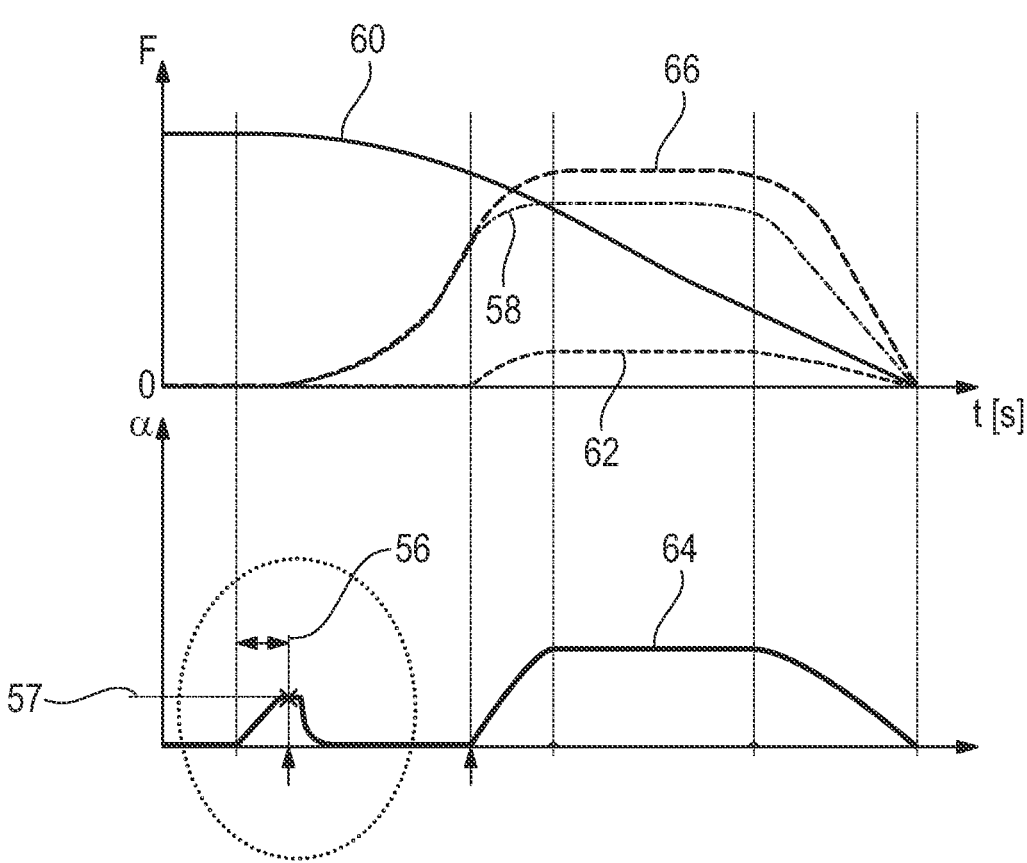
FIG. 5 shows a flow diagram of a possible sequence of the method according to the disclosure.

In the case of a normal braking operation, the vehicle speed initially falls only moderately (see curve 60 in FIG. 5). There is therefore sufficient time while the brake force F is increasing to carry out the determination of the current value of the brake touch point 56 on the brakes on the axle whose brakes have not yet been actuated (see FIG. 5). In this example, these are the electromechanical service brakes 52 without force sensors of the rear axle 46.

The brake touch point 56 is here acquired in the form of a travel point 57 in dependence on a total rotation angle α of the shaft of the electric motor 28. This travel point 57 constitutes a measure of the air gap 19 that is to be set.

The determination of the current value of the brake touch point 56 is carried out symmetrically and simultaneously on all the brakes 52 of the axle 46.

In the event that the electromechanical brakes 50 of the front axle 44 are able to meet the braking demand fully, the sequence ends here (see FIG. 3).

However, if more kinetic energy must be reduced than can be achieved by the electromechanical service brakes 50 of the front axle 44, the electromechanical service brakes 52 of the rear axle 46 are additionally actuated (see curves 62, 64 in FIG. 5 and also FIG. 4). The total brake force F available (see curve 66 in FIG. 5) is now used brake the vehicle 42 to a standstill in this example. The brake force F of the brakes 52 of the rear axle 46 is here connected in uniformly and constantly, so that a step in the brake force F is avoided. Likewise, at the end of the braking operation, the brake force is faded out again by the brakes 52 of the rear axle 46 uniformly and constantly.

If the determination of the current value of the brake touch point 56 is already complete at the time at which the brakes 52 of the rear axle 46 are connected in, this current value is used for the actuation of the brakes 52.

However, if the determination is not yet complete, it is terminated and the brakes 52 are actuated, wherein the previous value stored in the control unit 32 is used for the value of the brake touch point 56.

If the regeneration function of the drive motor 55 is used to meet the braking demand, the brake force, in a variant of the method which has just been described, is initially applied solely by the drive motor 55. During this phase, the current values of the brake touch point 56 are determined on all the electromechanical brakes 52 without force sensors of the vehicle 42, optionally also on a plurality of axles simultaneously.

If the braking demand cannot be met solely by the regeneration of the drive motor 55 and kinetic energy of the vehicle 42 has not been reduced sufficiently, the brakes 50 on the front axle 44 are actuated as described above in a next step. If this is still not sufficient, the brakes 52 of the rear axle 46 are additionally connected in in a further step.

In principle, all measurements of the brake touch point 56 are terminated and the brake system 40 is actuated by the control unit 32 in accordance with a suitable scheme if an emergency situation is identified during the braking operation. For example, an ABS system, which actuates the brakes 50, 52 on the individual wheels 48 independently of one another, is then triggered.

In the variant of the brake system 40 in which a plurality of axles of the vehicle 42 are provided with electromechanical service brakes 52 without force sensors, the determination of the current values of the brake touch point 56 is carried out alternately on different axles.

The determination of the current values of the brake touch point 56 on a rear axle 46 can be carried out as described above, while the braking demand is initially fulfilled solely by the brakes of the front axle 44.

By contrast, the determination of the current values of the brake touch point 56 of the brakes on the front axle 44 takes place, for example, only in the case of moderate braking demands which can be met solely by the brakes 52 of the rear axle 46. As an alternative, this determination can of course also take place during regeneration by the drive motor 55.

It is possible to determine the current value of the brake touch point 56 at each braking operation. It is, however, also conceivable to carry out this determination in accordance with a different predefined scheme.

In this example, a force-travel characteristic curve of the electromechanical service brake 52 is also determined by the acquisition element 30. This is effected by moving the actuating piston 12 in direction R until the brake 52 is fully closed, wherein the total rotation angle α of the shaft of the electric motor 28 is measured. If all the elements of the ball screw 24 are sufficiently rigid (for example if they consist of metal), it can be assumed that the total rotation angle α of the shaft of the electric motor 28 and that of the spindle 26 are exactly proportional. The total rotation angle α of the shaft of the electric motor 28 thus constitutes an exact measure of the position of the actuating piston 12 and thus the closed position of the brake.

In order to pass through the force-travel characteristic curve, the electric motor 28 is energized, for example, with a known, unregulated, increasing current ramp. At the same time, the total rotation angle of the shaft of the electric motor 28 is measured by the acquisition element 30. The relationship between the operating current of the electric motor 28 and the brake force F can be calculated from the total rotation angle α, simulated or determined beforehand by measurement using a force sensor. In each case, starting from a known force-travel characteristic curve of the electromechanical service brake 52, a change in the force-travel characteristic curve can be determined by such a measurement and thus an adapted force-travel characteristic curve can be prepared.

Both the brake touch point 56 and the force-travel characteristic curve are determined separately for each individual service brake 52 without a force sensor.

The force-travel characteristic curve mostly changes only slightly during a single journey of the vehicle. Therefore, the force-travel characteristic curve is measured, for example, only once per journey. Optionally, this is carried out when the vehicle is being parked, during closing of a parking brake. During this period of time, in a variant, all the electromechanical service brakes 52 without force sensors of the brake system 40 are moved from the fully open to the fully closed position and the total rotation angle α of the shaft of the electric motor 28 is measured in dependence on the supplied current. These data are transmitted to the control unit 32, where they are processed in order to determine the current force-travel characteristic curve. This is stored in the control unit 32 and used as the basis for the braking operations of the next journey.

This method can also be carried out when one of the electromechanical service brakes 52 without force sensors itself acts as a parking brake. Because the locking mechanism 34 is not closed until the brake has reached its fully closed state, and this operation is not especially time-critical, it is possible to use the determination of the force-travel characteristic curve for closing the parking brake.

Other electromechanical service brakes 52 without force sensors of the vehicle 42 can be measured as described above during closing of the parking brake.

The invention claimed is:

1. A method for operating a brake system of a vehicle having a plurality of axles provided with electromechanical service brakes, wherein at least the electromechanical service brakes on one axle are electromechanical brakes without force sensors, comprising the steps:

actuating the electromechanical service brakes on one of the axles of the vehicle during a braking operation in order to provide at least part of a required brake force, determining a current value of a brake touch point of the electromechanical service brakes without force sensors on another axle that is currently not being used to provide the brake force of the ongoing braking operation, and setting an air gap of those electromechanical service brakes without force sensors in accordance with the current value of the brake touch point.

2. The method according to claim 1, wherein, for determining the current value of the brake touch point of the electromechanical service brake, an electric motor of the electromechanical service brake is energized and a rotation speed of the electric motor is acquired, wherein the brake touch point is concluded from a reduction in the rotation speed.

3. The method according to claim 2, wherein, in a braking operation, first only the electromechanical service brakes of one axle are actuated and at the same time the determination of the current brake touch point is carried out on at least one other axle for the electromechanical service brakes arranged on that axle.

4. The method according to claim 1, wherein, in a braking operation, first only the electromechanical service brakes of one axle are actuated and at the same time the determination of the current brake touch point is carried out on at least one other axle for the electromechanical service brakes arranged on that axle.

5. The method according to claim 4, wherein the electromechanical service brakes on a plurality of axles of the vehicle are actuated in order to meet a braking demand, wherein the electromechanical service brakes of one axle are actuated first and then electromechanical service brakes without force sensors of another axle are connected in, and wherein a current value of the brake touch point of the electromechanical service brakes without force sensors on that axle is determined before those electromechanical service brakes are connected in.

6. The method according to claim 5, wherein electromechanical service brakes provided with force sensors on a first axle of the vehicle are actuated during each braking operation, and at least during some braking operations a current value of the brake touch point is determined on electromechanical service brakes without force sensors on a second axle of the vehicle.

7. The method according to claim 5, wherein, where there are electromechanical service brakes without force sensors on a plurality of axles of the vehicle, the electromechanical service brakes of one axle are actuated first and then the electromechanical service brakes of another axle are connected in after the determination of the current brake touch point has been carried out on the electromechanical service brakes which are connected in, wherein, in the case of successive braking operations in time, the electromechanical service brakes that are actuated first alternate.

8. The method according to claim 7, wherein at least one of the axles is connected to a regenerative electric drive motor of the vehicle, and the determination of the current brake touch point is carried out at least on the electromechanical service brakes without force sensors of one axle during regeneration.

9. The method according to claim 4, wherein electromechanical service brakes provided with force sensors on a first axle of the vehicle are actuated during each braking operation, and at least during some braking operations a current value of the brake touch point is determined on electromechanical service brakes without force sensors on a second axle of the vehicle.

10. The method according to claim 4, wherein, where there are electromechanical service brakes without force sensors on a plurality of axles of the vehicle, the electromechanical service brakes of one axle are actuated first and then the electromechanical service brakes of another axle are connected in after the determination of the current brake touch point has been carried out on the electromechanical service brakes which are connected in, wherein, in the case of successive braking operations in time, the electromechanical service brakes that are actuated first alternate.

11. The method according to claim 1, wherein at least one of the axles is connected to a regenerative electric drive motor of the vehicle, and the determination of the current brake touch point is carried out at least on the electromechanical service brakes without force sensors of one axle during regeneration.

12. A b rake system of a vehicle, for carrying out a method according to claim 1, comprising, electromechanical service brakes on at least two axles of the vehicle, wherein the electromechanical service brakes on at least one axle are designed without force sensors, and wherein there is a control unit which is so designed that it is able to control a braking operation for meeting a braking demand by activating the electromechanical service brakes of all the axles in a temporal sequence, and wherein there is arranged on each of the electromechanical service brakes without force sensors, an acquisition element which acquires a parameter from which a current brake touch point of the electromechanical service brake in question can be determined, wherein the control unit is so designed that it carries out the determination of the brake touch point during the ongoing braking operation.

13. The b rake system according to claim 12, wherein the acquisition element is a rotation speed sensor on an electric motor of the electromechanical service brakes.

14. The brake system according to claim 13, wherein the electromechanical service brakes on a front axle of the vehicle are equipped with force sensors and the electromechanical service brakes on the rear axle are configured without force sensors.

15. The brake system according to claim 13, wherein the electromechanical service brakes on a front axle and on a rear axle of the vehicle are configured without force sensors.

16. The b rake system according to claim 12, wherein the electromechanical service brakes on a front axle of the vehicle are equipped with force sensors and the electromechanical service brakes on the rear axle are configured without force sensors.

17. The b rake system according to claim 12, wherein the electromechanical service brakes on a front axle and on a rear axle of the vehicle are configured without force sensors.

* * * * *